United States Patent
Garg et al.

(10) Patent No.: US 12,154,040 B2
(45) Date of Patent: Nov. 26, 2024

(54) SYSTEM AND METHOD FOR TRAINING RECOMMENDATION POLICIES

(71) Applicant: Tata Consultancy Services Limited, Mumbai (IN)

(72) Inventors: Diksha Garg, Noida (IN); Pankaj Malhotra, Noida (IN); Priyanka Gupta, Noida (IN); Lovekesh Vig, Gurgaon (IN); Gautam Shroff, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 934 days.

(21) Appl. No.: 17/194,366

(22) Filed: Mar. 8, 2021

(65) Prior Publication Data

US 2022/0156607 A1    May 19, 2022

(30) Foreign Application Priority Data

Nov. 13, 2020  (IN) .............................. 202021049695

(51) Int. Cl.
  *G06N 5/04*   (2023.01)
  *G06N 20/00*   (2019.01)

(52) U.S. Cl.
  CPC .............. *G06N 5/04* (2013.01); *G06N 20/00* (2019.01)

(58) Field of Classification Search
  CPC .......... G06N 5/04; G06N 20/00; G06N 3/044; G06N 3/0442
  See application file for complete search history.

(56) References Cited

U.S. PATENT DOCUMENTS

| | | | |
|---|---|---|---|
| 2015/0067724 A1* | 3/2015 | Johnson | H04N 21/4668 725/32 |
| 2018/0293498 A1 | 10/2018 | Campos et al. | |
| 2019/0332923 A1 | 10/2019 | Gendron-Bellemare et al. | |
| 2020/0134887 A1 | 4/2020 | Zeng et al. | |
| 2020/0293883 A1 | 9/2020 | Budden et al. | |

OTHER PUBLICATIONS

Wang et al., "Off-Policy Recommendation System Without Exploration," May 6, 2020, Advances in Knowledge Discovery and Data Mining. PAKDD 2020 (Year: 2020).*

(Continued)

*Primary Examiner* — Eric Nilsson
*Assistant Examiner* — Vincent Anton Spraul
(74) *Attorney, Agent, or Firm* — Finnegan, Henderson, Farabow, Garrett & Dunner, LLP

(57) ABSTRACT

Session-based Recommendation (SR) is the task of recommending the next item based on previously recorded user interactions. However, most existing approaches for SR either rely on costly online interactions with real users (model-free approaches) or rely on potentially biased rule-based or data-driven user-behavior models (model-based approaches) for learning. This disclosure relates to a system and method for selecting session-based recommendation policies using historical recommendations and user feedback. Herein, the learning of recommendation policies given offline or batch data from old recommendation policies based on a Distributional Reinforcement Learning (DRL) based recommender system in the offline or batch-constrained setting without requiring access to a user-behavior model or real-interactions with the users.

4 Claims, 4 Drawing Sheets

(56) References Cited

OTHER PUBLICATIONS

Dabney et al., "Distributional Reinforcement Learning with Quantile Regression," 2017, arXiv:1710.10044 (Year: 2017)*
Wu et al., "Session-Based Recommendation with Graph Neural Networks," 2019, arXiv:1811.00855 (Year: 2019).*
Hidasi et al, "Session-Based Recommendations with Recurrent Neural Networks," 2016, arXiv:1511.06939v4 (Year: 2016).*
Liu et al, "A Recurrent Neural Network Based Recommendation System," 2016, https://api.semanticscholar.org/CorpusID:20954405 (Year: 2016).*
Fujimoto et al, "Benchmarking Batch Deep Reinforcement Learning Algorithms," 2019, arXiv:1910.01708v1 (Year: 2019).*
Zhao et al., "Obtaining Accurate Estimated Action Values in Categorical Distributional Reinforcement Learning," Knowledge-Based Systems (2020).

* cited by examiner

SYSTEM AND METHOD FOR TRAINING RECOMMENDATION POLICIES

CROSS-REFERENCE TO RELATED APPLICATIONS AND PRIORITY

This U.S. patent application claims priority under 35 U.S.C. § 119 to India Application No. 202021049695, filed on Nov. 13, 2020. The entire contents of the abovementioned application are incorporated herein by reference.

TECHNICAL FIELD

The disclosure herein generally relates to a field of session-based recommendation policies, more specifically to, a system and method for training one or more session-based recommendation policies using historical recommendations and user feedbacks.

BACKGROUND

Session-based Recommendation (SR) is the task of recommending the next item based on previously recorded user interactions. Further, the SR approaches aim to dynamically recommend items to a user based on the sequence of ongoing interactions (e.g. different types of feedback on recommendations) in a session. SR approaches allow for efficient and continuous strategy updation based on the user's real-time feedback, rather than a traditional fixed greedy recommendation strategies for recommending items. Several existing Deep Learning (DL) approaches for SR are designed to maximize the immediate (short-term) reward for recommendations. More recently, Deep Reinforcement Learning (DRL) approaches have been proposed that maximize the expected long-term cumulative reward by looking beyond the immediate user recommendation. Such approaches can optimize recommendations for long-term user engagement instead of maintaining a myopic objective of optimizing the immediate user recommendation.

However, most existing approaches for SR either rely on costly online interactions with real users (model-free RL approaches) or rely on potentially biased rule-based or data-driven user-behavior models (model-based RL approaches) for learning. Moreover, the existing deep Q-learning approaches to SR can potentially be used in an off-policy learning setting but would still need to rely on further on-policy interactions in the environment to avoid overestimation bias when learning the value function. This issue is further aggravated in the SR setting, where the user environments and rewards (feedbacks) tend to be highly stochastic and difficult to model as user profiles are not available, and the latent user preferences tend to be complex and diverse. This stochasticity is even more apparent in the SR setting, where no past information or demographic details of the user (environment) are available. The effects of this stochasticity are amplified in the batch RL learning setting, where logs from sub-optimal policies are biased, and do not depict the true user behavior characteristics. Therefore, robust estimation of the reward distribution from the environment (user) can be challenging in the batch learning scenarios, where further interactions with the environment are not allowed.

SUMMARY

Embodiments of the present disclosure provides technological improvements as solutions to one or more of the abovementioned technical problems recognized by the inventors in conventional systems. For example, in one embodiment, a method and system for training one or more session-based recommendation policies using historical recommendations and user feedback is provided.

In one aspect, a system is configured for training one or more session-based recommendation policies using historical recommendations and user feedback. The system comprises at least one memory storing a plurality of instructions and one or more hardware processors communicatively coupled with the at least one memory, wherein the one or more hardware processors are configured to execute one or more modules.

The system is configured to receive a plurality of historical data comprising of a sequence of a plurality of recommendations and one or more feedbacks on the plurality of recommendations. Herein, the one or more feedbacks includes positive and negative feedbacks on the plurality of recommendations. The received plurality of historical data is partitioned into four parts i.e. first set of data (D1), second set of data (D2), third set of data (D3) and fourth set of data (D4) based on a predefined chronological order. Further, the system is configured to train an embedding initializer model (NN1) using a supervised learning-based approach to get pre-trained item and action embeddings using the first set of data (D1). Herein, the first set of data (D1) is pre-processed to get a first set of filtered D1 corresponding to the received one or more positive feedbacks. An item embedding look-up matrix is initialized based on the pre-trained item embedding corresponding to a plurality of items. Further, the system is configured to model session embeddings corresponding to the sequences of positive feedback items from the respective ongoing sessions using a recommendation policy model (NN3). One or more quantile session embeddings are estimated from one session embedding and the one or more quantiles.

Furthermore, the system is configured for a supervised learning to get a recommendation mimicking model (NN2) using the second set of data (D2), One or more relevant actions based on a predefined probability threshold are obtained using the recommendation mimicking model (NN2) for constraining actions. Further, the system is configured to obtain action embeddings corresponding to the obtained relevant actions and one or more Q-values corresponding to the one or more quantiles using the action embeddings and the multiple quantile session embeddings. Further, the system is configured to update the recommendation mimicking model (NN2) and train the recommendation policy model (NN3) using the third set of data (D3) and the multiple Q-values. Finally, the system is configured to select at least one hyper-parameter corresponding to the recommendation mimicking model (NN2) and the recommendation policy model (NN3) based on the performance on the fourth set of data (D4). Thus, the recommendation policy model (NN3) corresponding to the at least one hyper-parameter is used as a final recommendation policy.

In another aspect, a processor-implemented method for training one or more session-based recommendation policies using historical recommendations and user feedback is provided. The method comprises one or more steps as follows. The method comprising receiving a plurality of historical data comprising of a sequence of a plurality of recommendations and one or more feedbacks on the plurality of recommendations. Herein, the one or more feedbacks includes positive and negative feedbacks on the plurality of recommendations. The received plurality of historical data is partitioned into four parts i.e. first set of data (D1), second set of data (D2), third set of data (D3) and fourth set of data (D4) based on a predefined chronological order. Further, the method includes training embedding initializer model (NN1) using supervised learning to get a pre-trained item and action embeddings using the first set of data (D1), Herein, the first set of data (D1) is pre-processed to get a set of filtered D1 corresponding to the received positive feedbacks. An item embedding look-up matrix is initialized using the pre-trained item embedding corresponding to a plurality of items. Further, the method includes modelling session embeddings corresponding to the sequences of positive feedback items in the respective ongoing sessions using a recommendation policy model (NN3). One or more quantile session embeddings are estimated from one session embedding and the one or more quantiles.

Furthermore, the method includes supervised learning to get a recommendation mimicking model (NN2) using the second set of data (D2). One or more relevant actions based on a predefined probability threshold are obtained on the recommendation mimicking model (NN2). Further, the method includes obtaining action embeddings corresponding to the obtained relevant actions and one or more Q-values corresponding to the one or more quantiles using the action embeddings and the multiple quantile session embeddings. Further, the method includes updating the recommendation mimicking model (NN2) and train the recommendation policy model (NN3) using the third set of data (D3) and the multiple Q-values. Finally, the method includes selecting at least one hyper-parameter corresponding to the recommendation mimicking model (NN2) and the recommendation policy model (NN3) based on the performance on the fourth set of data (D4). Thus, the recommendation policy model (NN3) corresponding to the at least one hyper-parameter is used as a final recommendation policy.

In yet another aspect, a non-transitory computer readable medium for training one or more session-based recommendation policies using historical recommendations and user feedback is provided. The non-transitory computer readable medium storing one or more instructions which when executed by a processor on a system cause the processor to perform method.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
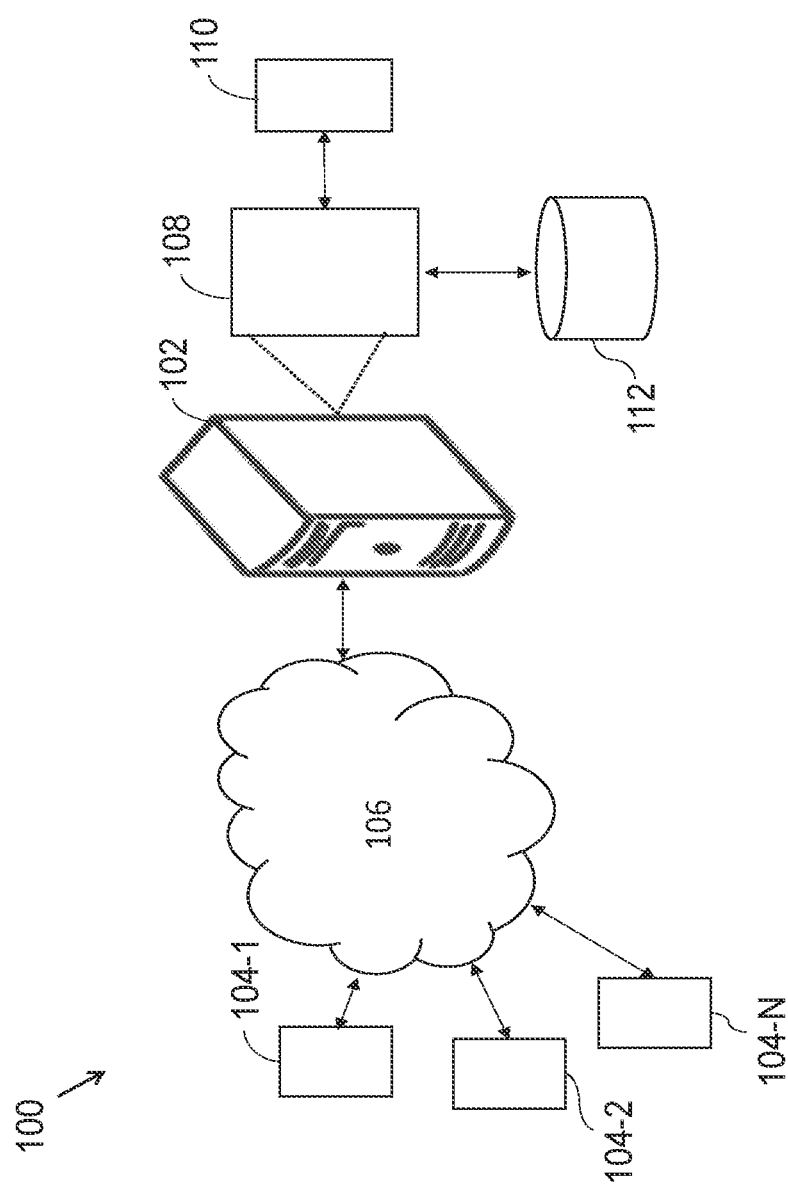
FIG. 1 illustrates an exemplary system for selecting at least one session-based recommendation policy using historical recommendations and user feedback, according to an embodiment of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The embodiments herein provide a system and method for training one or more session-based recommendation policies using historical recommendations and user feedback. It is to be noted that the session-based recommendation (SR) policies aim to dynamically recommend items to a user based on the sequence of ongoing interactions (e.g. item clicks) in a session. Rather than the traditional fixed greedy recommendation strategies for recommending items, the SR approaches allow for efficient and continuous strategy updation based on the user's real-time feedback.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates a block diagram of a system (100) for training one or more session-based recommendation policies using historical recommendations and user feedback, in accordance with an example embodiment. Although the present disclosure is explained considering that the system (100) is implemented on a server, it may be understood that the system (100) may comprises one or more computing devices, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system comprises at least one memory (102), one or more hardware processors (108), one or more databases (112), a pre-processing module (116), an embedding initializer model (118), a recommendation mimicking model (120), and a recommendation policy model (122). The components and functionalities of the system (100) are described further in detail.

Herein, the system (100) for a batch-constrained distributional reinforcement learning (RL) for one or more session-based recommendations is provided. It would be appreciated that the Batch RL, Offline RL, Batch-Constrained RL are the same and are used interchangeably in the disclosure. Herein, the batch-constrained distributional Q-learning for session-based recommendations can handle overestimation bias in off-policy learning and stochastic nature of users at the same time. Further, herein the system builds upon the recent advances in batch-constrained deep Q-learning to learn solely from offline logs, and distributional RL to deal with the stochastic nature of rewards from the users (environments). Furthermore, the system is configured for the batch-constrained deep reinforcement learning (DRL) setup. The system can be trained to improve upon the sub-optimal policy given a fixed batch data of user behavior logs from a sub-optimal policy, while reducing overestimation errors and popularity bias, and better modeling the stochasticity in behavior across users.

It would be appreciated that the system is significantly improve upon the behavior policy as well as strong RL and non-RL baselines in the batch setting, i.e. without feedback from online interactions or user-behavior models, and the system is more robust in highly stochastic user environments compared to baselines. Apparently, learning of an RL agent solely from historical logs obtained from other (e.g. traditional non-RL) recommendation policies without costly real-world interactions can be useful in practical scenarios. It can potentially enable learning of near-optimal policies using data obtained by deploying less costly, easy-to train, and fast-to-deploy heuristics- or rule-driven sub-optimal behavior policies. Once a batch of data from potentially sub-optimal policies is gathered, the RL agent can be learned from given dataset without further feedback from the costly real-world interactions, or without the biased data-driven user-behavior models.

In one embodiment of the disclosure, the I/O interface (104) of the system (100) is configured to receive a plurality of historical data comprising of a plurality of items, a sequence of a plurality of recommendations and one or more feedbacks on the plurality of recommendations. Herein, the one or more feedbacks includes positive and negative feedbacks on the plurality of recommendations. The received plurality of historical data is partitioned into four parts i.e. first set of data (D1), second set of data (D2), third set of data (D3) and fourth set of data (D4) based on a predefined chronological order.

In another embodiment of the disclosure, the system (100) is configured to train an embedding initializer model (NN1) using the supervised learning to get a pre-trained item and action embeddings using the first set of data (D1). Herein, the first set of data (D1) is pre-processed to get a set of filtered D1 corresponding to the received positive feedbacks. An item embedding look-up matrix is initialized based on the pre-trained item embedding corresponding to the plurality of items.

Herein, the embedding initializer model (NN1) is modelled using Graph Neural Network (GNN) and an attention network. The GNN models the session representation into a graph corresponding to the session. The graph comprising a plurality of nodes and a plurality of edges between node-pairs of the plurality of nodes, each node of the plurality of nodes indicative of items clicked in the session and each edge representing transitions between the items in the session.

In one aspect, consider collection of logs using some already deployed sub-optimal recommendation policy where logs are considered as the sequences of the interactions made by the anonymous users within their respective sessions. The proposed approach aims to improve upon that already deployed sub-optimal policy simply by learning using those collected logs without having any further interactions with the real users. The new policy is learnt in a way to handle stochasticity across users-behaviours and popularity bias. For ensuring better user experience, the proposed approach consists of an evaluation module to establish the validity of the new policy in an offline manner itself.

Figure 2:
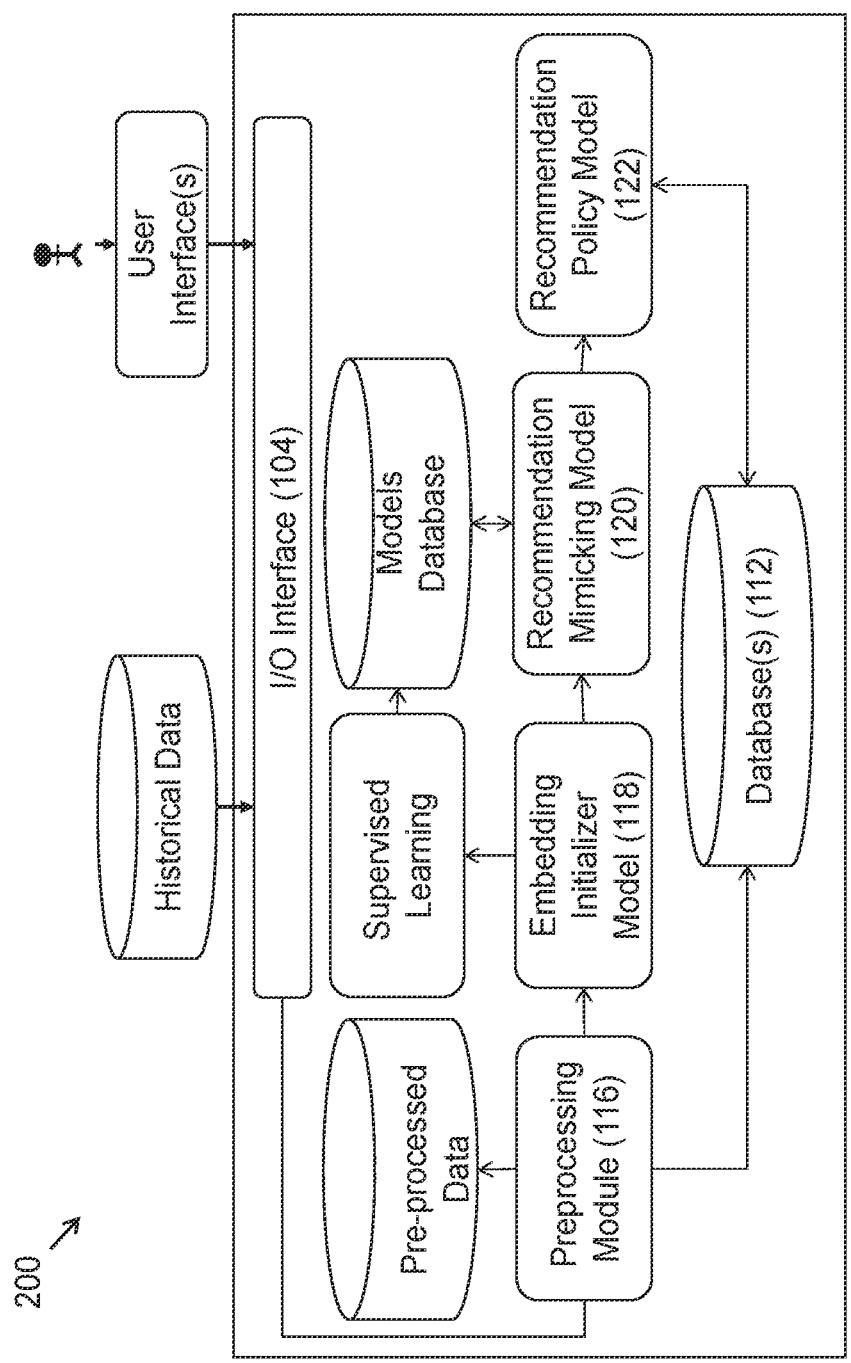
FIG. 2 is a functional block diagram to illustrate selecting at least one session-based recommendation policy using historical recommendations and user feedback, in accordance with some embodiments of the present disclosure.

Referring FIG. 2, a functional block diagram (200), wherein the system (100) is configured to model session embeddings corresponding to the sequences of positive feedback items using a recommendation policy model (NN3). One or more quantile session embeddings are estimated from one session embedding and the one or more quantiles. Furthermore, the system is configured for a supervised learning to get a recommendation mimicking model (NN2) using the second set of data (D2). One or more relevant actions based on a predefined probability threshold are obtained using the recommendation mimicking model (NN2) for constraining actions.

Herein, the recommendation mimicking model (NN2) is modelled using GNN and an attention network. The GNN models the session representation into a graph corresponding to the session, the graph comprising a plurality of nodes and a plurality of edges between node-pairs of the plurality of nodes, each node of the plurality of nodes indicative of items clicked in the session and each edge representing transitions between the items in the session. It is to be noted that the recommendation policy model (NN3) is modelled using bi-directional Gated Recurrent Units (bi-GRU). The bi-GRU summarizes the session as session representation using the items clicked in the current session.

In another embodiment, the system (100) is configured to obtain action embeddings corresponding to the obtained relevant actions and one or more Q-values corresponding to the one or more quantiles using the action embeddings and the multiple quantile session embeddings. Further, the system is configured to update the recommendation mimicking model (NN2) and train the recommendation policy model (NN3) using the third set of data (D3) and the multiple Q-values.

In yet another embodiment, the system is configured to select at least one hyper-parameter corresponding to the recommendation mimicking model (NN2) and the recommendation policy model (NN3) based on the performance on the fourth set of data (D4). Thus, the recommendation policy model (NN3) corresponding to the at least one hyper-parameter is used as a final recommendation policy.

Typically, a catalog size is large resulting in an extremely large action space for the agent. The state space consisting of a sequence of a plurality of item interactions grows combinatorically in the catalog. Therefore, the items are represented as trainable vectors or embeddings in a dense space such that the embeddings of all the items constitute an action embedding matrix. The state of the agent is obtained from the sequence of L most recent non-skip interactions i.e. interactions with positive feedback in a session. The corresponding state embedding is obtained from the item embedding state vectors via a recurrent neural network with parameters to obtain the state embedding and the value function is obtained from these embeddings.

It is to be noted that the errors in value estimation are possible for state-action pairs. Therefore, the action-space of the agent is constrained for a state such that it only chooses actions that are likely under the unknown behavior policy from which batch is generated. The action for the next state is selected intelligently under the guidance of state-conditioned generative model that approximates the policy. Herein, a behavior cloning network is trained in a supervised learning fashion with a cross-entropy loss to solve the |I|-way classification task over all pairs taken from tuples, wherein |I| is the size of the catalog.

Further, it is to be noted that the batch data tends to have high skew in the item distribution that subsequently results in biased and sub-optimal recommendations from the RL agent. Hence, the system is configured to implicitly handle the popularity bias during the training itself.

In one aspect, considering a Markov Decision Process (MDP) defined by the tuple of five elements (S, A, P, R, $\gamma$), where S is the state space, A is the action space, P(s'|s, $\alpha$) is the transition probability from state s to s', R(s, $\alpha$) is the random variable reward function, $\gamma \in (0,1)$ is the discount factor, s, s'$\in$ S and $\alpha \in$ A. Given a policy $\pi$, the value function for the agent following the policy is given by the expected return of the agent.

$$Q^\pi(s,\alpha)=E[Z^\pi(s,\alpha)]=E_\pi[\Sigma_{t=0}^\infty \gamma^t R(s_t,\alpha_t)] \quad (1)$$

wherein $s_t P(.\backslash/s_{t-1}, \alpha_{t-1})$, $\alpha_t \pi(.\backslash/s_t)$, $s_0=S$, $\alpha_0=\alpha$ A recommender agent (RA) in the SR setting interacts with a user (environment) by sequentially choosing the impression list of items (or the slate) to be recommended over a sequence of time steps, so as to maximize its cumulative reward while receiving feedback from the user. The state $s=\{s^1, s^2, \ldots s^L\} \in S$ corresponds to the browsing history of the user consisting of the most recent positive L interactions in the current session. An action $\alpha=\{\alpha^1, \alpha^2, \ldots \alpha^L\} \in A$ corresponds to a slate or impression list of I items chosen by the agent as a recommendation to the user based on the current state s, from a set I of currently available items not clicked by the user previously. The transition probability P(s'|s, $\alpha$) from the current state s to the next state $s_0$ depends on the response of the user to the action $\alpha$ taken by the RA in state s. The immediate reward r given state s and action $\alpha$ is determined by the response of the user, e.g. a click on an item results in r=1 while a skip results in r=0. The goal of training the RA is to obtain a policy $\pi(s, I)$ that chooses an action $\alpha$ (an impression list of items) from the set I given the current state s such that the long-term expected reward (e.g. number of buys) is maximized.

In another aspect, wherein the item-catalog size |I| is large (of the order of thousands, or even millions) resulting in an extremely large action space for the RA. Furthermore, the state space consisting of sequence of item interactions grows combinatorically in |I|. Herein, the items as trainable vectors or embeddings in a dense d-dimensional space such that the embeddings of all the items constitute a lookup matrix $I \in R^{|I| \times d}$ where the jth row of I corresponds to item $i_j$ represented $i_j \in R^d$. Any action $\alpha \in A$ corresponds to an item, therefore, the action embedding $\alpha \in R^d$. Further, the system finds that initializing the item embeddings, i.e. the matrix I via pre-training a supervised model for next item prediction to be useful. The previously clicked or interacted items in a session are used to predict the next item using a graph neural network-based approach i.e. SRGNN. The item embedding matrix after training the SRGNN is used to initialize I. Other alternatives include a simple word2vec-like approach where items are analogous to words.

The state $s=\{s^1, s^2, \ldots s^L\}$ of the agent is obtained from the sequence of L most recent non-skip interactions (e.g. clicked items) in a session $s_t$. The corresponding state embedding s is obtained from the item embedding vectors $s^k \in I$ (k=1 ... L) via a bi-directional gated recurrent units (BiGRU) network with parameters $\theta$ to obtain the state embedding s=$Wh_L$+b, where $h_L$=BiGRU ($s^1, s^2, \ldots s^L$) is the final hidden state of BiGRU, and $W \in R^{d \times d}$ and $b \in R^d$ are the parameters of the final linear layer.

When selecting next action, $\alpha'$ such that (s, $\alpha$, s') is distant from data contained in the batch B, the estimate $Q_\theta$, (s', $\alpha'$) may be arbitrarily erroneous, affecting the learning process. This overestimation bias might resulting from a mismatch in the distribution of data induced by the current policy versus the distribution of data contained in B implies slower convergence of learning due to difficulty in learning a value function for a policy which selects actions not contained in the batch.

To avoid the overestimation bias, the system is configured to constrain the action-space of the agent for a state s such that it only chooses actions that are likely under the unknown behavior policy $\pi_b$ from which B is generated, as used in discrete batch-constrained Q-learning (BCQ). The action for the next state is selected under the guidance of a state-conditioned generative model M that approximates the policy $\pi_b$ such that the probability $p_M(\alpha|s) \approx \pi_b(\alpha|s)$. Such a behavior cloning neural network is trained in a supervised learning fashion with a cross-entropy loss to solve the |I|-way classification task, $L_w(s, \alpha)=-\log(P_M(\alpha|s))$, over all pairs (s, $\alpha$) taken from tuples (s, $\alpha$, r, s')$\in$ B, where $$P_M(a|s;w) = \frac{\exp(s^T a)}{\sum_{i \in I} \exp(s^T i)};$$

w being the parameters of the neural network. The action space of the agent (recommendable items) is restricted to those actions that satisfy $P_M(\alpha'|s') > \beta$, $\beta \in (0,1)$. The training of M is equivalent to training a deep neural network for SR in a supervised manner, where the goal is to predict the next interaction item for a user given past interactions. Herein, the system is configured to choose the SRGNN as the neural network architecture for M.

In another aspect, wherein a single item $i_t \in I$ is recommended to the user at time t, and the response/choice of the user $c_t$ is available to the RA, where the choice is made from a pre-defined set of user-choices such as click, skip, etc. The immediate reward $r_t$ depends on the choice $c_t$. In addition, herein a target choice, maximizing the frequency of which maximizes the returns, e.g. click-through rate. For example, if target choice is click, then rewards of 0 for skip, 1 for click can be considered. Here, skip is considered as a negative interaction whereas click is considered as a positive interaction. A session till time t can thus be represented as $S_t=\{(i_1, c_1, r_1), \ldots, (i_t, c_t, r_t)\}$. For computational reasons, the last L positive (non-skip) interactions in a session are used to determine the current state of the agent.

In yet another aspect, wherein the environment is highly stochastic given the variety of users with varying interests and behaviors, the system is trained in a distributional RL fashion using an Implicit Quantile Networks (IQN), where K samples from a base distribution, e.g. $\tau \sim U([0,1])$ are reparametrized to K quantile values of a target distribution. The estimation of action-value for $\tau$-quantile is given by $Q_\theta^\tau$ (s, $\alpha$)=$s_\tau^T a$, where $s_\tau = s \circ \emptyset(\tau)$, (where $\circ$ Hadamard product) for some differentiable function $\emptyset$ with $\emptyset: [0,1] \to \mathbb{R}^d$ computing the embedding for the quantile $\tau$. Herein, this form of the value function allows to efficiently compute the values for all actions (items) in parallel via multiplication of the item-embedding lookup matrix I and the vector $s_\tau$, i.e. using $I s_\tau$. This is important as action space can be large in SR.

Further, the jth dimension of $\emptyset(\tau)$ is computed as $\emptyset_j(\tau)$= ReLU($\Sigma_{i=0}^{n-1} \cos(\pi i \tau) w_{ij} + b_j$) where $w_{ij}$ and $b_j$ for i=0, ... n−1 and j=0, ... d−1 are trainable parameters. The final loss for training the system is computed over all K² pairs of quantiles based on K estimates each from the current network with parameters $\theta$ and the target network with parameters $\theta'$, and by using M to constrain the action space as follows:

$$L_{BCD}(\theta) = \frac{1}{K^2} E_{s,a,r,s'} \left[ \sum_\tau \sum_{\tau'} l_\tau(r + \gamma Q_{\theta'}^{\tau'}(s', a') - Q_\theta^\tau(s, a)) \right] \quad (2)$$

$$a' = \underset{a' | P_m(a'|s') > \beta}{\mathrm{argmax}} \frac{1}{k} \sum_\tau Q_\theta^\tau(s', a')$$

where, $\tau$ and $\tau'$ are sampled from uniform distribution U([0, 1]), $l_\tau$ is the quantile Huber loss $l_\tau(\delta)=|\tau-I(\delta<0)|L_k(\delta)$ Huber loss $L_k$:$L_k(\delta)=0.5\delta^2$ if $\delta \leq k$ and $k(|\delta|-0.5 k)$ otherwise. An estimate of the value can be recovered through the mean over the quantiles, and the policy $\pi$ is defined by greedy selection over this value $$\pi(s) = \mathrm{argmax}_a \frac{1}{K} \sum_\tau Q_\theta^\tau(s, a).$$

The policy $\pi$ thus obtained is used as the recommendation policy.

Figure 3:
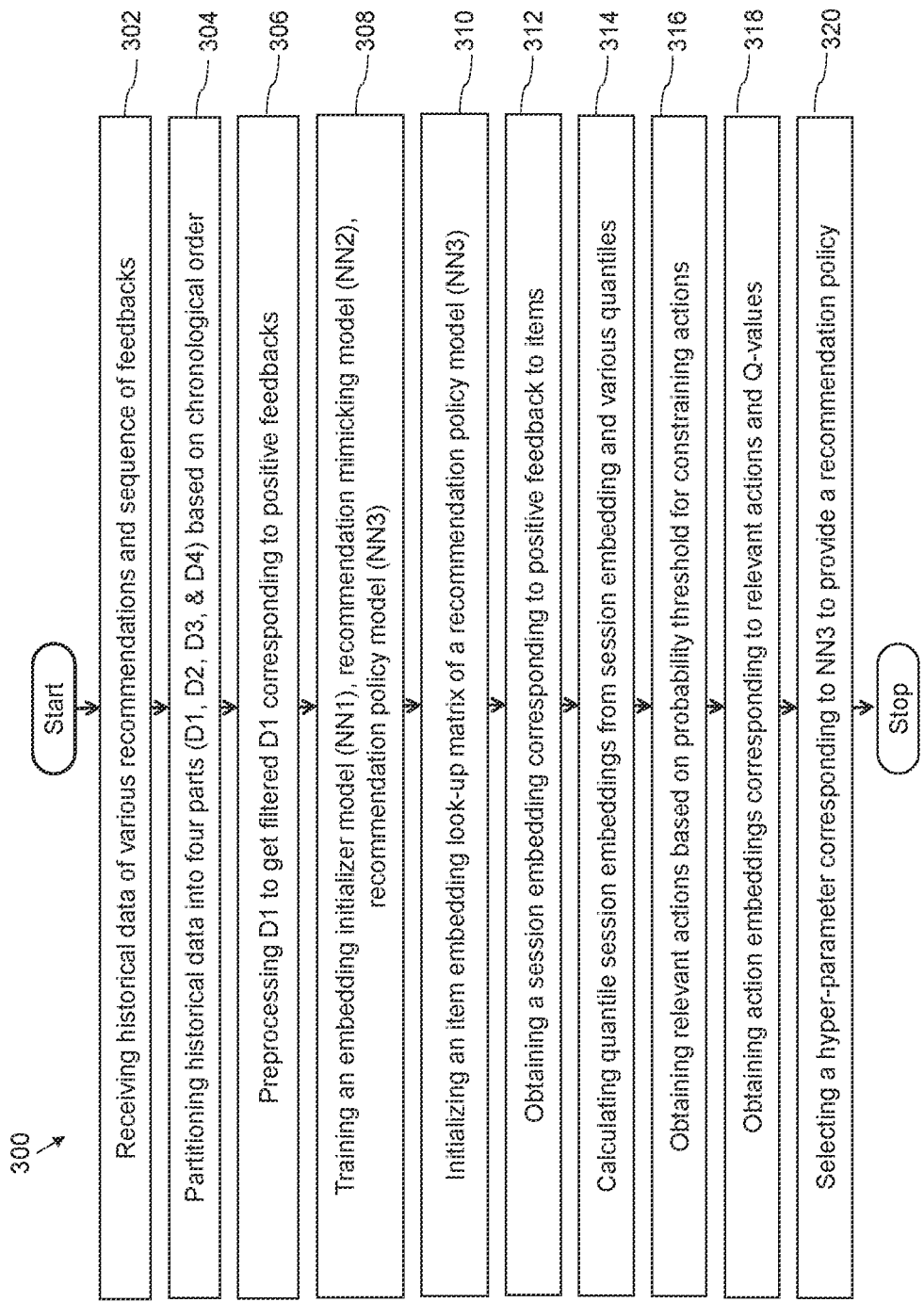
FIG. 3 is a flow diagram to illustrate a method for selecting at least one session-based recommendation policy using historical recommendations and user feedback, in accordance with some embodiments of the present disclosure.

Referring FIG. 3, wherein a flow diagram (300) to illustrate a processor-implemented method for training one or more session-based recommendation policies using historical recommendations and user feedback is provided. The method comprises one or more steps as follows.

Initially, at the step (302) receiving a plurality of historical data comprising of a plurality of items, a sequence of a plurality of recommendations and one or more feedbacks on the plurality of recommendations. Herein, the one or more feedbacks includes positive and negative feedbacks on the plurality of recommendations as explained in the FIG. 4.

At the step (304), the received plurality of historical data is partitioned into four parts i.e. first set of data (D1), second set of data (D2), third set of data (D3) and fourth set of data (D4) based on a predefined chronological order.

At the step (306), pre-processing the first set of data (D1) according to the received sequence of one or more positive feedbacks to obtain a set of filtered D1.

At the step (308), an embedding initializer model (NN1) is trained in a supervised learning manner to get a pre-trained item and action embeddings using the first set of data (D1). It is to be noted that the first set of data (D1) is pre-processed to get a set of filtered D1 corresponding to the received positive feedbacks.

At the step (310), an item embedding look-up matrix is initialized based on the pre-trained item embedding corresponding to a plurality of items.

At the step (312), obtaining session embeddings corresponding to the sequences of positive feedback items using a recommendation policy model (NN3). Herein, one or more quantile session embeddings are calculated from the obtained one session embedding and the one or more quantiles.

At the step (314), calculating a plurality of quantile session embeddings from the obtained session embedding and one or more quantiles. Herein, the one or more quantiles are sampled from a uniform distribution. Further, a supervised learning is used to get a recommendation mimicking model (NN2) using the second set of data (D2).

At the step (316), one or more relevant actions based on a predefined probability threshold are obtained using the recommendation mimicking model (NN2) for constraining actions.

At the step (318), a plurality of action embeddings is obtained corresponding to the obtained relevant actions and one or more Q-values corresponding to the one or more quantiles using the action embeddings and the multiple quantile session embeddings, Herein, the one or more Q-values are a dot product of quantile session embeddings and a plurality of action embeddings. Further, the recommendation mimicking model (NN2) is updated and the recommendation policy model (NN3) is trained using the third set of data (D3) and the multiple Q-values.

Finally, at the last step (320), at least one hyper-parameter is selected corresponding to the recommendation mimicking model (NN2) and the recommendation policy model (NN3) based on the performance on the fourth set of data (D4). Thus, the recommendation policy model (NN3) corresponding to the at least one hyper-parameter is used as a final recommendation policy.

Figure 4:
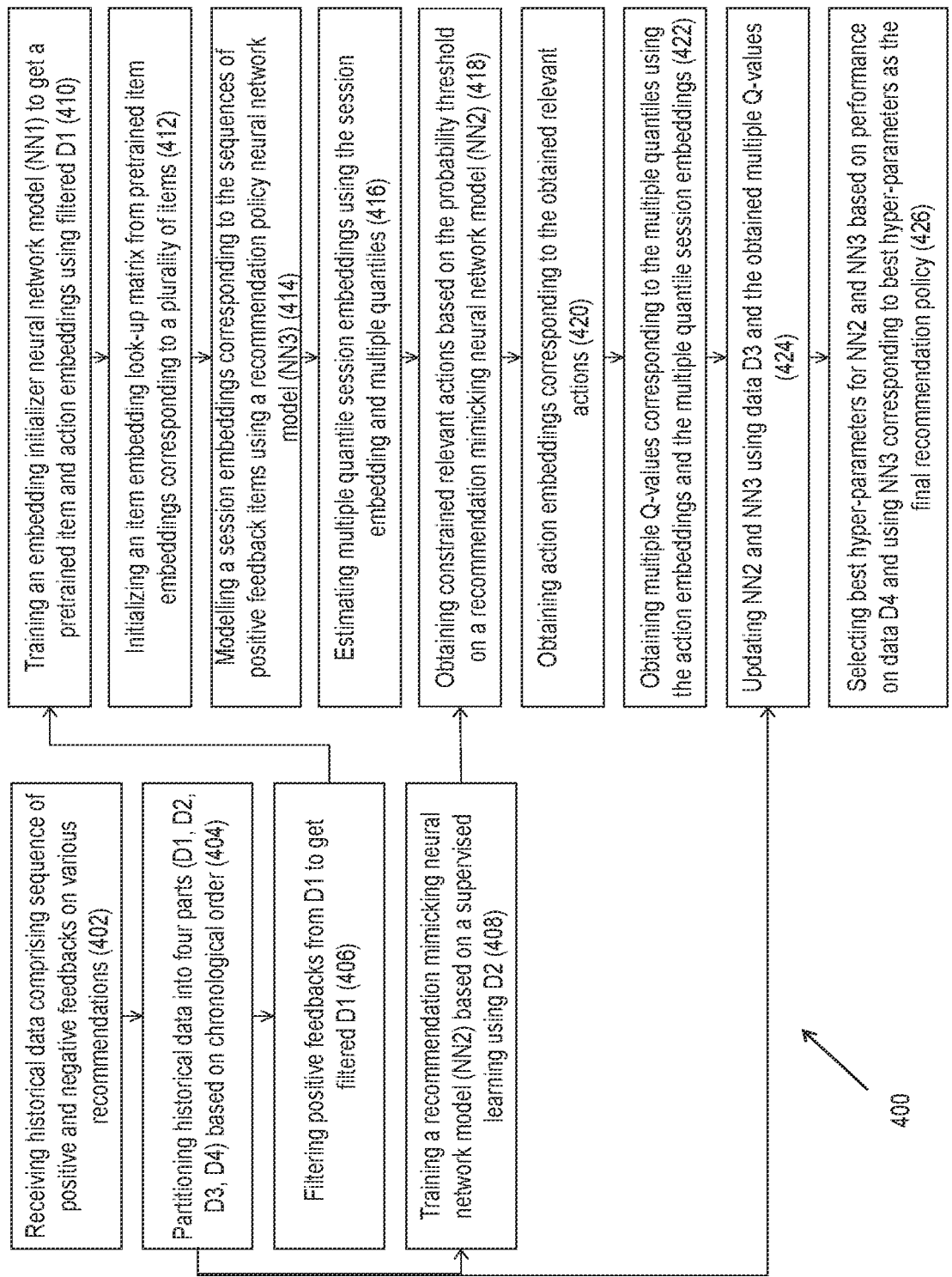
FIG. 4 is a functional flow chart to illustrate at least one session-based recommendation policy selection using historical recommendations and user feedback, in accordance with some embodiments of the present disclosure.

In another embodiment, explaining a functional flow chart (400) as referred in FIG. 4, wherein at step (402) a sequence of positive and negative feedbacks on various recommendations are received. At step (404), the historical data is partitioned into four parts (D1, D2, D3, and D4) based on a chronological order. At the step (406), various positive feedbacks are filtered from the D1 to get a filtered D1. At the step (408), a recommendation mimicking neural network model (NN2) is trained based on a supervised learning using D2. At the step (410), an embedding initializer neural network model (NN1) is trained using filtered D1 to get a pre-trained item and action embeddings. At the step (412), an item embedding look-up matrix is initialized from the pre-trained item embeddings corresponding to a plurality of items. At the step (414), modelling a session embedding corresponding to the sequence of positive feedback items using a recommendation policy neural network model (NN3). At the step (416), estimating multiple quantile session embeddings using the session embedding and the multiple quantiles. At the step (418), obtaining constrained relevant actions based on the probability threshold on the recommendation mimicking neural network model (NN2). At the step (420) obtaining action embeddings corresponding to the obtained relevant actions. At the step (422), multiple Q-values are obtained corresponding to the multiple quantiles using the action embeddings and the multiple quantile session embeddings. At the step (424), the NN2 and NN3 are updated using D3 and the obtained multiple Q-values and at the last step (426) best hyper-parameters for NN2 and NN3 based on performance on data D4 using the NN33 corresponding to the best hyper-parameters as the final recommendation policy.

The embodiments of present disclosure herein address unresolved problem associated with existing approaches for session-based recommendations either rely on costly online interactions with real users (model-free approaches) or rely on potentially biased rule-based or data-driven user-behavior models (model-based approaches) for learning. Herein, the system and method for training one or more session-based recommendation policies using historical recommendations and user feedback is provided. Further, the system and method provide a batch-constrained distributional reinforcement learning (RL) for one or more session-based recommendations. The batch-constrained distributional Q-learning for session-based recommendations can handle overestimation bias in off-policy learning and stochastic nature of users at the same time.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purpose of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for selecting at least one session-based recommendation policy comprising:

receiving, via an input/output interface, a plurality of historical data comprising of a plurality of items, a plurality of recommendations and a sequence of one or more feedbacks on each of the plurality of recommendations wherein the sequence of one or more feedbacks include one or more positive and one or more negative feedbacks;

partitioning, via one or more hardware processors, the received plurality of historical data into four parts namely a first set of data (D1), a second set of data (D2), a third set of data (D3) and a fourth set of data (D4) based on a predefined chronological order;

preprocessing, via one or more hardware processors, the first set of data (D1) according to the received sequence of one or more positive feedbacks to obtain a set of filtered D1;

training, via the one or more hardware processors, an embedding initializer model (NN1) using supervised learning and the obtained set of filtered D1 to get a plurality of trained item embeddings and a plurality of action embeddings corresponding to each of the plurality of items, wherein the NN1 is modelled using Graph Neural Network (GNN) and an attention network, wherein the GNN models a graph corresponding to a session, wherein the graph comprises a plurality of nodes and a plurality of edges between node-pairs of the plurality of nodes, each node of the plurality of nodes indicative of items clicked in the session and each edge representing transitions between the items in the session;

initializing, via the one or more hardware processors, an item embedding look-up matrix of a recommendation policy model based on the plurality of trained item embeddings, wherein the NN3 is modelled using bi-directional Gated Recurrent Units (bi-GRU), and wherein the bi-GRU summarizes the session using the plurality of items clicked in a current session;

obtaining, via the one or more hardware processors, a session embedding corresponding to the sequence of one or more positive feedbacks to the plurality of items using the recommendation policy model (NN3);

calculating, via the one or more hardware processors, a plurality of quantile session embeddings from the obtained session embedding and one or more quantiles, wherein the one or more quantiles are sampled from uniform distribution;

training, via the one or more hardware processors, a recommendation mimicking model (NN2) based on the second set of data (D2), wherein the NN2 is modelled using the Graph Neural Network (GNN) and the attention network;

obtaining, via the one or more hardware processors, one or more relevant actions based on a predefined probability threshold using the trained recommendation mimicking model (NN2) for constraining actions;

obtaining, via the one or more hardware processors, a plurality of action embeddings corresponding to the obtained one or more relevant actions and one or more Q-values, wherein the one or more Q-values are a dot product of quantile session embeddings and a plurality of action embeddings;

training, via the one or more hardware processors, the recommendation policy model (NN3) using the trained recommendation mimicking model (NN2), the third set of data (D3) and the one or more Q-values;

selecting, via the one or more hardware processors, at least one hyper-parameter corresponding to the recommendation policy model (NN3) based on the performance on the fourth set of data (D4), wherein the at least one hyper-parameter is used to provide a recommendation policy;

obtaining a state embedding from state vectors of the plurality of trained item embedding via a recurrent neural network; and selecting, an action for a next state associated with the state embedding using a state conditioned generative model that approximates the recommendation policy, wherein the state conditioned generative model is a behavior cloning neural network trained in a supervised learning fashion with a cross-entropy loss to solve a classification task of an item catalog.

2. The processor-implemented method of claim 1, wherein the Q-values are calculated corresponding to the one or more quantiles using the action embeddings and the plurality of quantile session embeddings.

3. A system for selecting at least one session-based recommendation policy comprising:

an input/output interface to receive a plurality of historical data comprising of a plurality of items, a plurality of recommendations and a sequence of one or more feedbacks on each of the plurality of recommendations, wherein the sequence of one or more feedbacks include one or more positive and one or more negative feedbacks;

one or more hardware processors;

a memory in communication with the one or more hardware processors, wherein the one or more hardware processors are configured to execute programmed instructions stored in the memory, to:

partition the received plurality of historical data into four parts namely first set of data (D1), second set of data (D2), third set of data (D3) and fourth set of data (D4) based on a predefined chronological order;

preprocess the first set of data (D1) according to the received sequence of one or more positive feedbacks to obtain a set of filtered D1;

train an embedding initializer model (NN1) using supervised learning and the obtained set of filtered D1 to get a plurality of trained item embeddings and a plurality of action embeddings corresponding to each of the plurality of items, wherein the NN1 is modelled using Graph Neural Network (GNN) and an attention network, wherein the GNN models a graph corresponding to a session, wherein the graph comprises a plurality of nodes and a plurality of edges between node-pairs of the plurality of nodes, each node of the plurality of nodes indicative of items clicked in the session and each edge representing transitions between the items in the session;

initialize an item embedding look-up matrix of a recommendation policy model (NN3) based on the plurality of trained item embeddings, wherein the NN3 is modelled using bi-directional Gated Recurrent Units (bi-GRU), and wherein the bi-GRU summarizes the session using the plurality of items clicked in a current session;

obtain a session embedding corresponding to the sequence of one or more positive feedbacks to the plurality of items using the recommendation policy model (NN3);

calculate a plurality of quantile session embeddings from the obtained session embedding and one or more quantiles, wherein the one or more quantiles are sampled from uniform distribution;

train a recommendation mimicking model (NN2) based on the second set of data (D2), wherein the NN2 is modelled using the Graph Neural Network (GNN) and the attention network;

obtain one or more relevant actions based on a predefined probability threshold are obtained using the recommendation mimicking model (NN2) for constraining actions;

obtain a plurality of action embeddings corresponding to the obtained one or more relevant actions and one or more Q-values, wherein the one or more Q-values are a dot product of quantile session embeddings and a plurality of action embeddings;

train the recommendation policy model (NN3) using the trained recommendation mimicking model (NN2), the third set of data (D3) and the one or more Q-values;

select at least one hyper-parameter corresponding to the recommendation policy model (NN3) based on the performance on the fourth set of data (D4), wherein the at least one hyper-parameter is used to provide a recommendation policy;

obtain a state embedding from state vectors of the plurality of trained item embedding via a recurrent neural network; and select, an action for a next state associated with the state embedding using a state conditioned generative model that approximates the recommendation policy, wherein the state conditioned generative model is a behavior cloning neural network trained in a supervised learning fashion with a cross-entropy loss to solve a classification task of an item catalog.

4. A non-transitory computer readable medium storing one or more instructions which when executed by one or more processors on a system, cause the one or more processors to perform method for training one or more session-based recommendation policies using historical recommendations and user feedback comprising:

receiving, via an input/output interface, a plurality of historical data comprising of a plurality of items, a plurality of recommendations and a sequence of one or more feedbacks on each of the plurality of recommendations, wherein the sequence of one or more feedbacks include one or more positive and one or more negative feedbacks;

partitioning, via one or more hardware processors, the received plurality of historical data into four parts namely first set of data (D1), second set of data (D2), third set of data (D3) and fourth set of data (D4) based on a predefined chronological order;

preprocessing, via one or more hardware processors, the first set of data (D1) to get a set of data corresponding to the received sequence of one or more positive feedbacks;

training, via the one or more hardware processors, an embedding initialize r model (NN1) using supervised learning and the pre-processed first set of data (D1) to get a plurality of trained item embeddings and a plurality of action embeddings corresponding to each of a plurality of items, wherein the NN1 is modelled using Graph Neural Network (GNN) and an attention network, wherein the GNN models a graph corresponding to a session, wherein the graph comprises a plurality of nodes and a plurality of edges between node-pairs of the plurality of nodes, each node of the plurality of nodes indicative of items clicked in the session and each edge representing transitions between the items in the session;

initializing, via the one or more hardware processors, an item embedding look-up matrix of a recommendation policy model (NN3) based on the plurality of trained item embeddings, wherein the NN3 is modelled using bi-directional Gated Recurrent Units (bi-GRU), and wherein the bi-GRU summarizes the session using the plurality of items clicked in a current session;

obtaining, via the one or more hardware processors, a session embedding corresponding to the sequence of one or more positive feedback to items using the recommendation policy model (NN3);

calculating, via the one or more hardware processors, a plurality of quantile session embeddings from the obtained session embedding and one or more quantiles, wherein the one or more quantiles are sampled from uniform distribution;

training, via the one or more hardware processors, a recommendation mimicking model (NN2) based on the second set of data (D2), wherein the NN2 is modelled using the Graph Neural Network (GNN) and the attention network;

obtaining, via the one or more hardware processors, one or more relevant actions based on a predefined probability threshold using the trained recommendation mimicking model (NN2) for constraining actions;

obtaining, via the one or more hardware processors, a plurality of action embeddings corresponding to the obtained one or more relevant actions and one or more Q-values, wherein the one or more Q-values are a dot product of quantile session embeddings and action embeddings;

training, via the one or more hardware processors, the recommendation policy model (NN3) using the trained recommendation mimicking model (NN2), third set of data (D3) and the one or more Q-values;

selecting, via the one or more hardware processors, at least one hyper-parameter corresponding to the recommendation policy model (NN3) based on the performance on the fourth set of data (D4), wherein the at least one hyper-parameter is used to provide a recommendation policy;

obtaining a state embedding from state vectors of the plurality of trained item embedding via a recurrent neural network; and selecting, an action for a next state associated with the state embedding using a state conditioned generative model that approximates the recommendation policy, wherein the state conditioned generative model is a behavior cloning neural network trained in a supervised learning fashion with a cross-entropy loss to solve a classification task of an item catalog.

* * * * *